(No Model.)
T. G. TRITT.
RING HOOK.
No. 532,926. Patented Jan. 22, 1895.
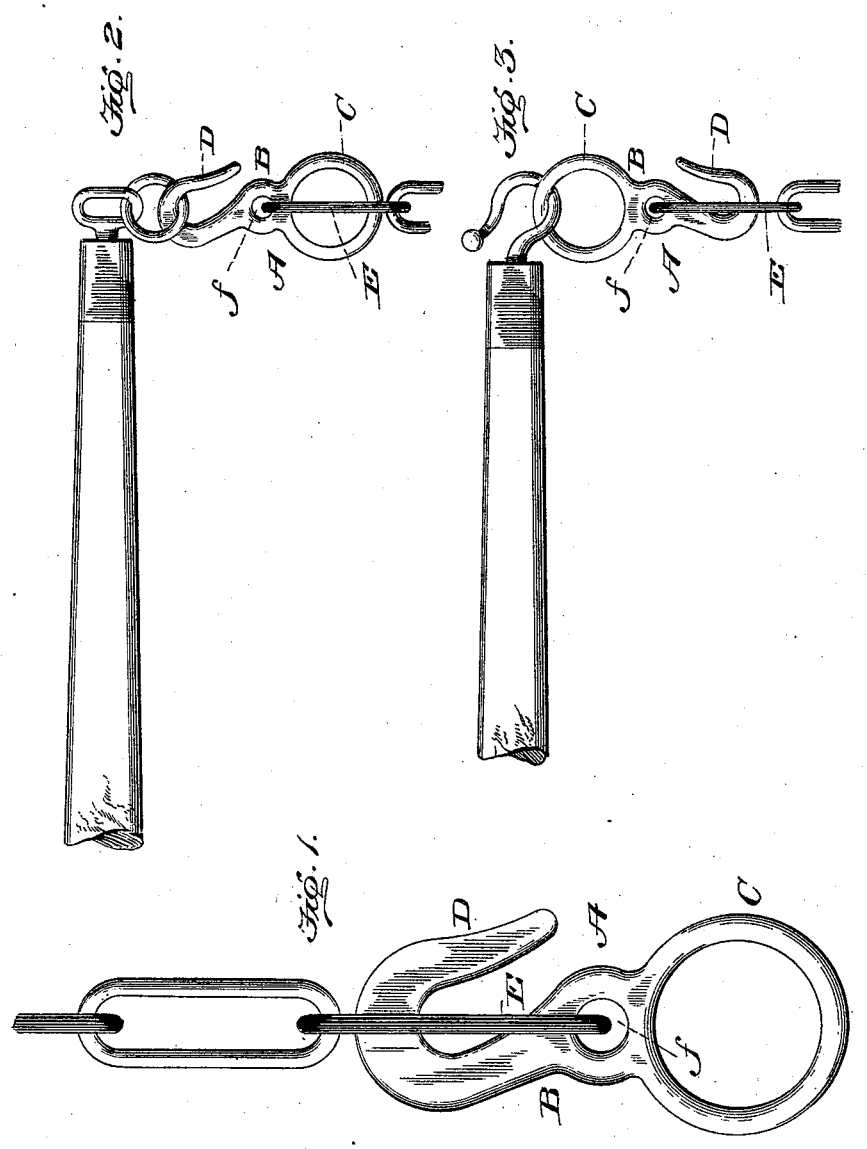
Witnesses:
Wm C Dashiell
H. F. Benkauf
Inventor.
T. Grove Tritt
BY Edson Bro's,
Attorneys

UNITED STATES PATENT OFFICE.

T. GROVE TRITT, OF CARLISLE, PENNSYLVANIA, ASSIGNOR TO L. F. BOWER AND GARRICK MALLERY, OF SAME PLACE.

RING-HOOK.

SPECIFICATION forming part of Letters Patent No. 532,926, dated January 22, 1895.

Application filed July 7, 1894. Serial No. 516,793. (No model.)

*To all whom it may concern:*

Be it known that I, T. GROVE TRITT, a citizen of the United States, residing at Carlisle, in the county of Cumberland and State of Pennsylvania, have invented certain new and useful Improvements in Ring-Hooks; and I do hereby declare the following to be a full, clear, and exact description of the invention, such as will enable others skilled in the art to which it appertains to make and use the same.

The nature of this invention is a double terminal appliance for chains which is so constructed that either end thereof can be used for attaching the chain to any suitable object or device; and it consists of a cast body having an eye or loop at one end and a hook at its other end, combined with a link which is attached to said body between the eye and hook, whereby the body can be turned within the link to bring either the eye or hook into service as may be required.

My improved terminal appliance can be used in different places and under different conditions, and as one example where the terminal appliance can be advantageously employed, I will mention that it can be used to connect trace chains to the single trees of vehicles. It is well known to those skilled in the art that single trees of vehicles are sometimes made with hooks to receive the end links of a trace or trace chain, and that other kinds of single trees are provided with rings or eyes to receive a hook on the end of a chain.

My improvement provides a simple and cheap appliance for a trace or trace chain which can be used either with a hook or an eye on the single tree because the body can be easily turned within the end link of the chain, to present either the hook or eye of the body for attachment to the single tree.

To enable others to more readily understand my invention, I have illustrated the preferred embodiment thereof in the accompanying drawings, in which—

Figure 1 is an elevation of my terminal appliance for chains, showing the swiveled link attached to one or more links forming a part of a chain. Figs. 2 and 3 are views illustrating my terminal appliance adapted as a trace chain attachment for use in connection with different fastenings on single trees, Fig. 2 showing the hook of the terminal appliance connected with a single tree ring, and Fig. 3 illustrating the eye, loop or ring of the terminal appliance connected with a hook fastener on a single tree.

Like letters of reference denote corresponding parts in all the figures, referring to which—

A denotes my double terminal appliance for chains. It consists of a body B which is cast or otherwise wrought, made or formed in a single piece of metal with a ring, loop or eye C and a hook D; and with this body B is combined a swiveled link E which is of such length and size and is so connected to the body that the parts can be turned to project either the hook D or the eye C beyond the link E and thus adapt the appliance A for use on different kinds of fasteners attached to the single trees of vehicles, or other objects.

The hook D is at one end of the body B, while the eye C is at the opposite end of said body; and to this body B is connected the end link E of the chain. This end link is connected to the body at a point between the eye C and hook D, to enable the body to be reversed within said end link; and this connection of the reversible body B to the end link E can be effected in any desirable way. As one method of connecting the body B and link E together I have shown the body as provided with a transverse aperture *f* at a point between the hook and eye, through which aperture is passed one end of the link, as shown by Fig. 1; but this particular method of connecting the body and link is not essential, because the aperture can be dispensed with and a bifurcated link or swivel can be attached by a transverse pivot or bolt to the body between the hook and eye thereof, as will be readily understood.

To enable the body to be reversed within the end link of a chain, it is necessary to employ a link E of such length and dimensions that the body can be turned freely end for end within the link. I, therefore, employ a link E which is sufficiently long for the body B to be reversed or turn therein.

Although my terminal appliance can be used in any relation or art in order to attach a chain to a suitable object, yet to illustrate one use to which the device can be put I have shown in Figs. 2 and 3 of the drawings my terminal appliance for a trace chain to be connected to different kinds of fasteners on a single tree. In Fig. 3 the single tree has a hook shaped fastener F, to which the ring, loop or eye C of my terminal appliance can be easily connected and thus obviate the objectionable loose link at the end of the trace chain and the rattling of such loose link.

If the appliance is to be attached to a ring like fastener G on the single tree shown in Fig. 2 the body B is reversed within the link E so that the eye C is inclosed in the link and the hook D projected beyond the same, said hook D being connected with the ring fastener as shown.

Having thus fully described my invention, what I claim as new, and desire to secure by Letters Patent, is—

A double terminal appliance for chains or the like consisting of a body provided at one end with a hook D and at its other end with an eye or ring C, and a link E connected to the body at a point between the hook and the ring or eye, for the purpose described, substantially as set forth.

In testimony whereof I affix my signature in presence of two witnesses.

T. GROVE TRITT.

Witnesses:
JOHN R. MILLER,
S. C. BEITZEL.